US008762385B2

(12) United States Patent
Gill et al.

(10) Patent No.: US 8,762,385 B2
(45) Date of Patent: Jun. 24, 2014

(54) METHODS AND SYSTEMS FOR IMPLEMENTING EMAIL RECIPIENT TEMPLATES

(75) Inventors: Bikram Singh Gill, Punjab (IN); Mayank Singh, Bhopal MP (IN); Amar Kg, Karnataka (IN)

(73) Assignee: Oracle International Corporation, Redwood Shores, CA (US)

( * ) Notice: Subject to any disclaimer, the term of this patent is extended or adjusted under 35 U.S.C. 154(b) by 211 days.

(21) Appl. No.: 13/016,357

(22) Filed: Jan. 28, 2011

(65) Prior Publication Data

US 2012/0197926 A1 Aug. 2, 2012

(51) Int. Cl.
*G06F 7/00* (2006.01)
*G06F 17/30* (2006.01)

(52) U.S. Cl.
CPC .............. *G06F 17/30342* (2013.01); *G06F 17/30424* (2013.01)
USPC .......................................... 707/741; 707/769

(58) Field of Classification Search
CPC ................... G06F 17/30342; G06F 17/30424
USPC .................... 707/769, 999.003, 741
See application file for complete search history.

(56) References Cited

U.S. PATENT DOCUMENTS

| 6,636,240 | B1 * | 10/2003 | Centerwall et al. ........... 715/752 |
| 7,209,951 | B2 | 4/2007 | Goldberg |
| 7,461,151 | B2 | 12/2008 | Colson et al. |
| 7,493,359 | B2 | 2/2009 | Fitzpatrick et al. |
| 7,552,179 | B2 | 6/2009 | Jain et al. |
| 7,552,185 | B1 | 6/2009 | Kirzner et al. |
| 8,037,143 | B1 * | 10/2011 | Atkins et al. .................. 709/206 |
| 2005/0177621 | A1 | 8/2005 | Moody et al. |
| 2005/0198144 | A1 * | 9/2005 | Kraenzel et al. ............. 709/206 |
| 2006/0168016 | A1 | 7/2006 | Barrett |
| 2007/0050456 | A1 * | 3/2007 | Vuong et al. .................. 709/206 |
| 2007/0255789 | A1 * | 11/2007 | Buchheit ....................... 709/206 |
| 2008/0021962 | A1 * | 1/2008 | Ryan et al. .................... 709/206 |
| 2008/0313283 | A1 | 12/2008 | Cohen et al. |

(Continued)

OTHER PUBLICATIONS

Malone, T. et al., "The Information Lens: An Intelligent System for Information Sharing in Organizations, " ACM SIGCHI Bulletin-Special issue: CHI '86 Conference Proceedings, 1986, pp. 1-8, vol. 17 issue 4.

*Primary Examiner* — Charles Lu
(74) *Attorney, Agent, or Firm* — Kilpatrick Townsend & Stockton LLP

(57) ABSTRACT

The present invention is directed to methods and systems for implementing email recipient templates. The method including extracting a first set of email addresses from a first email message and extracting a second set of email addresses from a second email message. The first and second set of email addresses are included in one or more of the to, cc, or bcc fields of the email messages. The method further including storing, in a storage database, the first set of email addresses in a first recipient template and storing the second set of email addresses in a second recipient template. The first recipient template and the second recipient template each have an associated unique identifier. Further, the method includes receiving a request for a new email message in an email editor user interface and querying the storage database for recipient templates. The query is filtered by the associated unique identifiers. Further, the method includes receiving the first recipient template and the second recipient template as a result of the query, and displaying, in the email editor user interface, the email addresses associated with the first recipient template and the second recipient template.

18 Claims, 9 Drawing Sheets

(56) References Cited

U.S. PATENT DOCUMENTS

| | | |
|---|---|---|
| 2009/0157828 A1 | 6/2009 | Agrawal |
| 2009/0300546 A1* | 12/2009 | Kwok et al. .................. 715/825 |
| 2010/0121922 A1* | 5/2010 | Tousignant et al. ........... 709/206 |

* cited by examiner

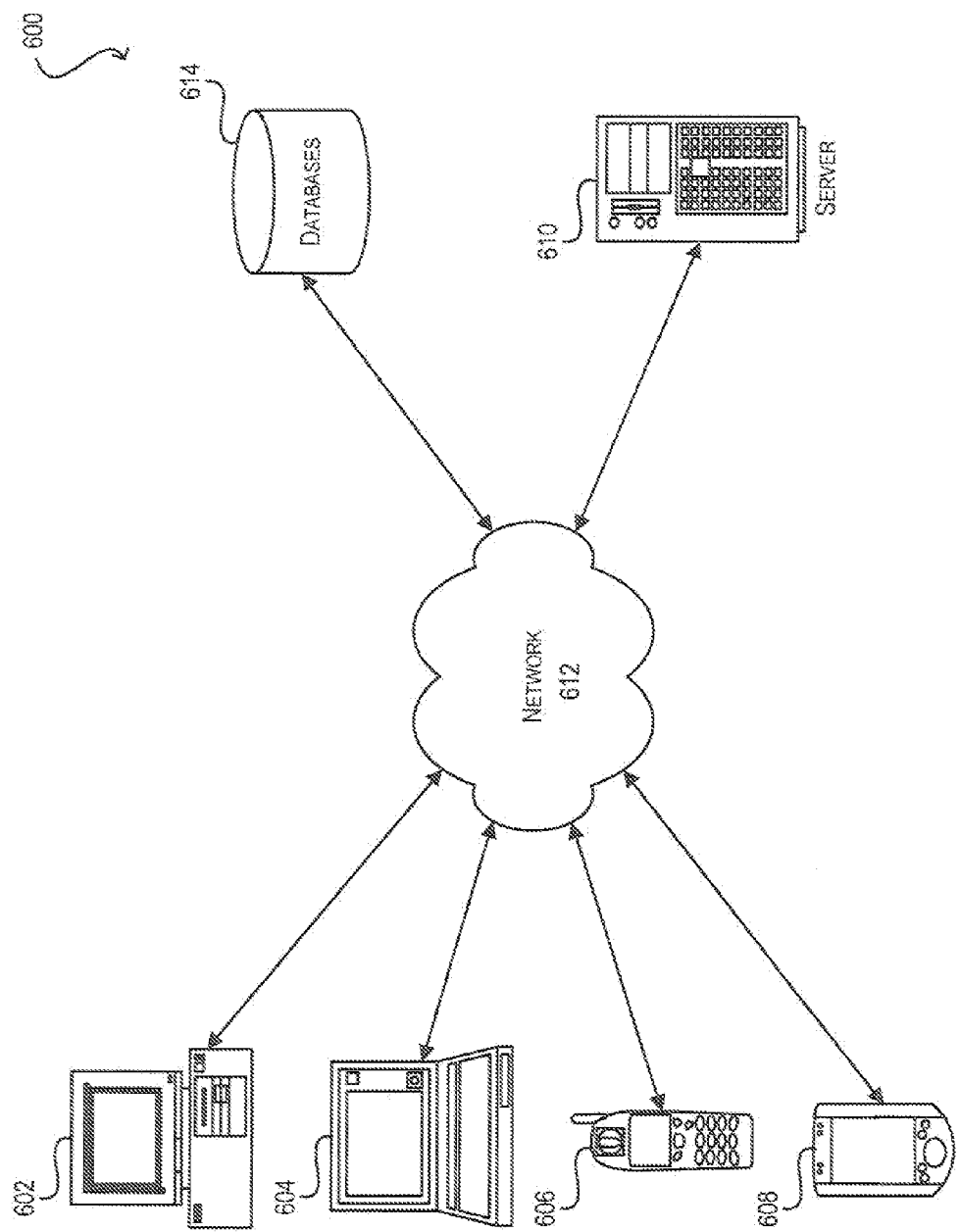

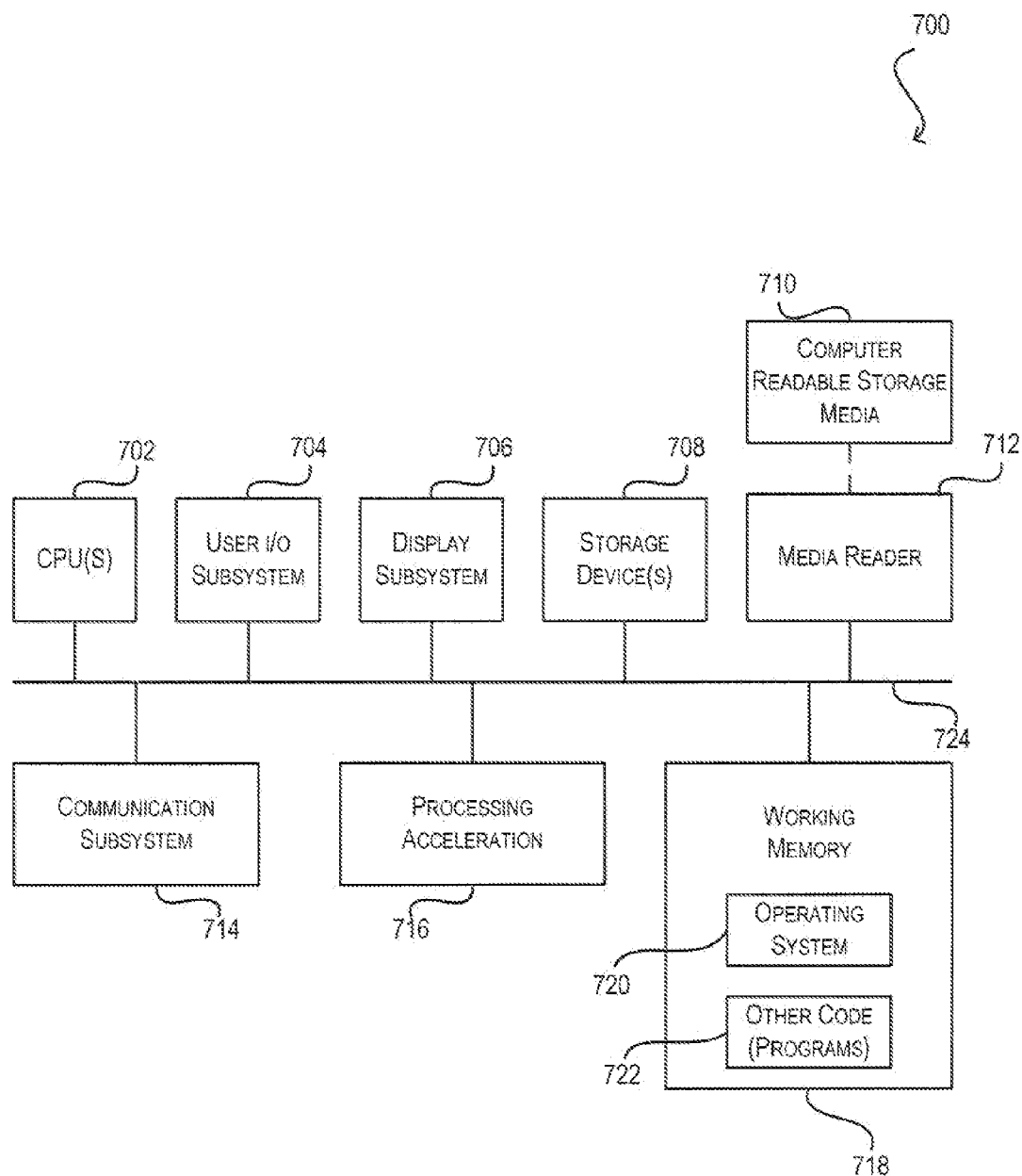

METHODS AND SYSTEMS FOR IMPLEMENTING EMAIL RECIPIENT TEMPLATES

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

In current email client programs and applications, users typically repeatedly send email messages to same group of user (e.g., weekly status reports to managers, HR/IT employees send news/policies to departments in an organization, etc.), but there is no quick and easy way to fill to/cc/bcc fields with email addresses or identification.

One way to accomplish filling of the fields is for users to use mailing lists which specify the email recipients, or alternatively the users may manually enter in the recipient email addresses or identification information. Some email application user interfaces allow for users to save email templates (e.g., Siebel™ email client) where the user can store to/cc/bcc fields of frequently used email addresses and identification. Nonetheless, each of these implementations for defining a mailing list depend on a user or an administrator manually creating the mailing list, and then the user or administrator remembering the mailing list for reuse. Accordingly, such implementations require special manual steps to create the mailing lists, which is not automated, and also there is no way in existing solutions to automate and auto-train the mailing-list creation and usage (i.e., no easy access to most used mailing lists, mail recipients, etc. based on historical data). Hence, improved rating and ranking methods and systems are needed in the art.

SUMMARY OF THE INVENTION

In one embodiment, a method for implementing email recipient templates, is described. The method including extracting a first set of email addresses from a first email message and extracting a second set of email addresses from a second email message. The first and second set of email addresses are included in one or more of the to, cc, or bee fields of the email messages. The method further including storing, in a storage database, the first set of email addresses in a first recipient template and storing the second set of email addresses in a second recipient template. The first recipient template and the second recipient template each have an associated unique identifier. Further, the method includes receiving a request for a new email message in an email editor user interface, and querying the storage database for recipient templates. The query is filtered by the associated unique identifiers. Further, the method includes receiving the first recipient template and the second recipient template as a result of the query, and displaying, in the email editor user interface, the email addresses associated with the first recipient template and the second recipient template.

In a further embodiment, a computer-readable medium for implementing email recipient templates, is described. The computer-readable medium includes instructions for extracting a first set of email addresses from a first email message and extracting a second set of email addresses from a second email message. The first and second set of email addresses are included in one or more of the to, cc, or bcc fields of the email messages. The computer-readable medium further includes instructions for storing, in a storage database, the first set of email addresses in a first recipient template and storing the second set of email addresses in a second recipient template. The first recipient template and the second recipient template each have an associated unique identifier. Further, the computer-readable medium includes instructions for receiving a request for a new email message in an email editor user interface and querying the storage database for recipient templates. The query is filtered by the associated unique identifiers. Further, the computer-readable medium includes instructions for receiving the first recipient template and the second recipient template as a result of the query, and displaying, in the email editor user interface, the email addresses associated with the first recipient template and the second recipient template.

In another embodiment, a system for implementing email recipient templates, is described. The system includes a storage device and a processor. The storage device has sets of instructions store thereon which, when execute by the processor cause the processor to extract a first set of email addresses from a first email message and extracting a second set of email addresses from a second email message. The first and second set of email addresses are included in one or more of the to, cc, or bcc fields of the email messages. The instructions further cause the processor to store, in a storage database, the first set of email addresses in a first recipient template and storing the second set of email addresses in a second recipient template. The first recipient template and the second recipient template each have an associated unique identifier. The instructions further cause the processor to receive a request for a new email message in an email editor user interface and querying the storage database for recipient templates. The query is filtered by the associated unique identifiers. The instructions further cause the processor to receive the first recipient template and the second recipient template as a result of the query, and display, in the email editor user interface, the email addresses associated with the first recipient template and the second recipient template.

BRIEF DESCRIPTION OF THE DRAWINGS

FIG. 6 is a simplified block diagram illustrating physical components of a system environment 600 that may be used in accordance with an embodiment of the present invention.

FIG. 7 is a simplified block diagram illustrating the physical components of a computer system 700 that may be used in accordance with an embodiment of the present invention.

DETAILED DESCRIPTION OF THE INVENTION

Figures 1A, 1B:
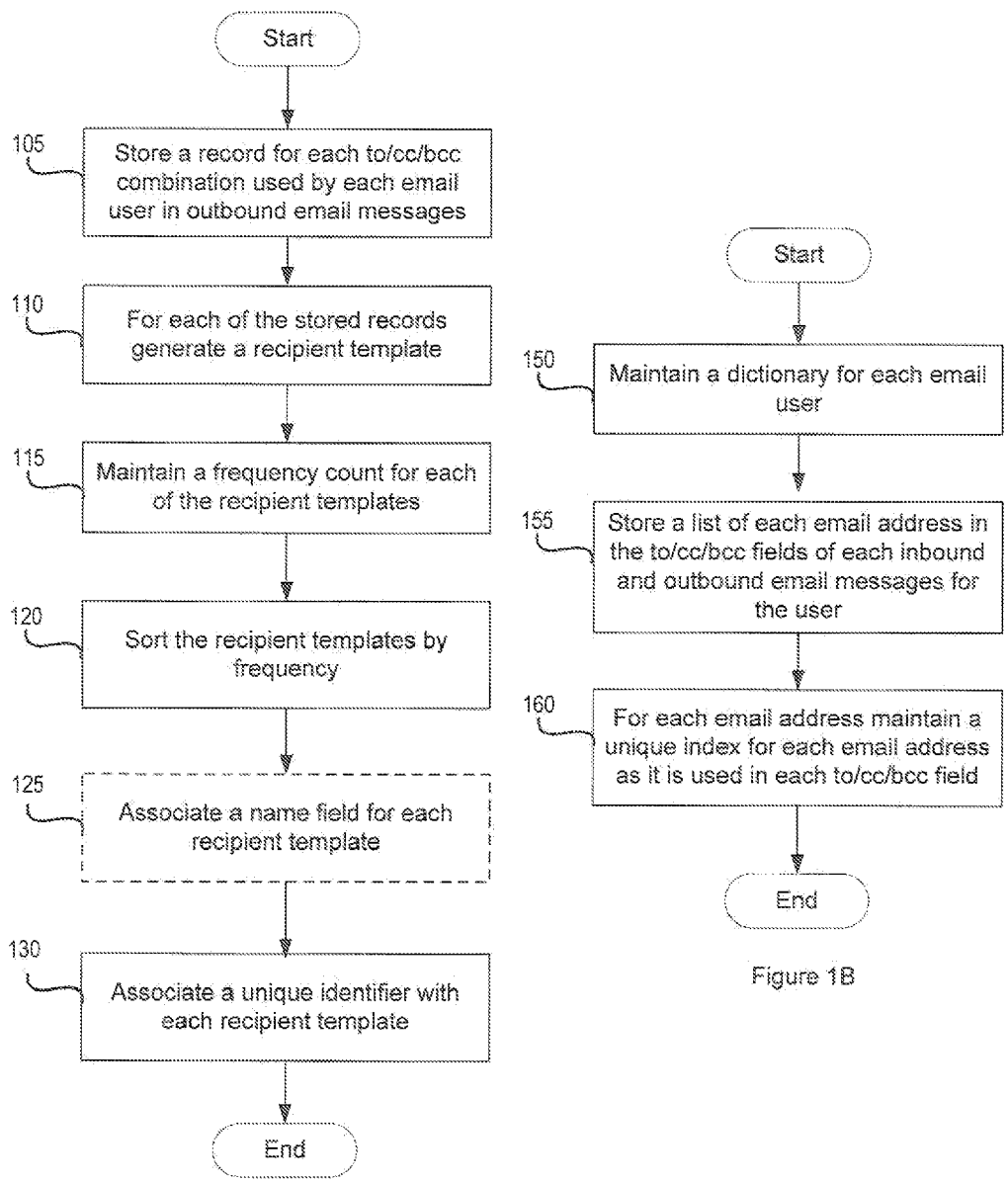
FIGS. 1A and 1B are flow, diagrams for methods of implementing email recipient templates, in accordance with aspects of the present invention.

The present invention is directed to a solution which allows users to quickly populate to/cc/bcc email fields using explicitly saved recipient templates or by using historical data from previously sent email messages. Also, the user can quickly view existing saved or historical templates using hot-keys which display, for example, selection boxes, to the user from which a specific template could be selected. Historical data may be maintained in an XML file and may also be updated when an email message is sent.

The historical data may be updated/maintained by maintaining a record for each to/cc/bcc combination used by an email user in an outbound email message. In one embodiment, this may be described as a historical "recipient template" record. A frequency count is maintained for each record which identifies how many times the "recipient template" has been used. Then, based on this stored saved data, an XML file may maintain information of the most frequently used recipient templates. In one embodiment, each "recipient template" may also have an optional field for associating a name to the template for easy reuse. Further, each "recipient template" has a field called a "unique index" which is a unique key for each "recipient template" in the file.

In addition to the above information, a dictionary may be maintained which includes following information. The dictionary may include a list of each email-id used by the user in to/cc/bcc field in any email (inbound or outbound). For each email address entry, 3 lists may be maintained: one each for to, cc, and bcc in which each list contains the "unique index" of the "recipient template" in which the email address has been used. This dictionary assists in quickly searching the recipient templates, based on an email address(es) entered by the user in to, cc, or bcc fields.

The stored recipient templates and dictionaries may allows users to type in email addresses in the to/cc/bcc fields, and then press a "hotkey" to display all templates which contain the email which a user has already typed (this allows the user to type in some email addresses in to/cc/bcc fields and then perform a search to retrieve short-listed "recipient template" records in which the same email addresses exist in the to/cc/bcc fields, respectively). As such, email addresses are filled in to the email to/cc/bcc fields based on the existing historical data, without the user being required to remember the mailing list names and without being required to enter in all of the associated email addresses. In a further embodiment, a drop-down list may be dynamically populated by the user interface as user types in email addresses in to the to/cc/bcc fields.

In a further embodiment, a user may explicitly create a "recipient template" prior to the initial use of the application. These explicitly saved "recipient template" may also be added to the XML file (or other file), and can also be queried by the user while accessing the "recipient template" using the above intuitive query, or a name based query. Furthermore, a user may also invoke a "hotkey" to display, for example, the top 5, 10, etc. most used email "recipient templates", and select one of them for use. This further increases the usability of the unnamed auto-generated "recipient templates", and moreover the explicitly saved "recipient template" will also be displayed in this list. In a further embodiment, a filter could be applied to only show explicit, auto-generated recipient templates or both "recipient template" types in the list.

In addition to the frequency and filter based user interface display or selection, the user may search for a template based on the names associated with the templates (i.e., such that a user can use the name WeeklyStatusReport for a recipient template for the weekly status email, or MyTeam with all team-members email addresses). A user could further customize the "recipient templates" by choosing to save the top 1000, 5000, etc. historical recipient templates to avoid record bloat, and choose to save templates with at least 2 or more email addresses for the auto-save option. Furthermore, some aspects of the present invention could also be leveraged to allow message broadcasts of other media items, such as SMS, chat, etc. to a group of users.

The present invention is very intuitive and provides a very simple way to reuse "recipient templates", and also, as the data is continually updated based on every email sent, the present invention is very effective at allowing users to reuse historically relevant and current template data. If a user does not desire to explicitly save templates, the user is still able to leverage the template feature based on historical data, and as such the feature is still accessible to "normal" (non-power) users, without any extra or new steps/processes.

Furthermore, as discussed above, existing email solutions do not support auto-save, and auto-learning of recipient lists. Also, mailing lists only allow saving of email addresses, with no affinity to either to/cc/bcc fields (this becomes important for certain types of regular emails like weekly status reports, etc.). As such, email clients become more accessible and intuitive to users; which is a significant advantage as new users will find it easier to use email clients, and experienced users will also find this feature very helpful. Most users in office/home generally send bulk of their emails/messages to select group of people, with similar to/cc/bcc fields populated, and this functionality makes the process much easier.

Turning now to FIG. 1A, which illustrates a method of implementing email recipient templates, in accordance with embodiments of the present invention. At process block 105, a record for each to/cc/bcc combination used by each email user in outbound email messages is stored. In one embodiment, the messages are stored in a persistent storage, such as a database, a dataset, etc.

At process block 110, for each of the stored records a recipient template may be created. The recipient template may include each of the email addresses within the combination. In one embodiment, a minimum number of email addresses May be required in order to invoke the generation of a recipient template. For example, email combinations with only one email address may be excluded, alternatively any number of email addresses may be the threshold.

Furthermore, at process block 115, a frequency count may be maintained for each of the recipient templates. For example, if the same combination of email addresses is used in an outbound email message five time, then the count for the corresponding recipient template would be five, and so on. As such, recipient templates (when presented to a user) may be sorted by frequency in order to present the user with the most frequently used email address combinations (process block 120).

At process block 125, an optional step of associating a name field with each of the recipient templates may occur. For example, if a recipient template is used by the user for a weekly sales meeting, the user may associate the name of weekly sales meeting with the recipient template. This name can then be used by the user for easy designation and retrieval.

Furthermore, at process block 130, a unique identifier is associated with each of the recipient templates. Accordingly, the recipient templates can be sorted and there is an assurance that no redundant recipient templates are generated. For example, two separate users on the same email enterprise system may send an email with the same email address combination, and because of the unique identifier, only one recipient template would be created by the email combination. Furthermore, each time a recipient template is created, the already stored email address combinations are checked to determine if a new template is needed, or if the combination already exists in a recipient template.

Referring now to FIG. 1B, which illustrates a method of implementing email recipient templates, in accordance with embodiments of the present invention. At process block 150, a dictionary for each mail user may be maintained. The mail directory may include all of the recipient templates created by the user, as well as all of the other recipient templates created by other users.

At process block 155, each of the email addresses in the to/cc/bcc fields may be stored for both inbound and outbound email messages for a given user. Then, for each of the email addresses an index may be maintained (process block 160). As such, the index may be used to cross-reference each email address with each or the recipient templates for which the email address is a member of. Therefore, an email address can be searched to determine which recipient templates that email address is a member of to determine how the email address is used in each of the to/cc/bcc fields.

Figure 2:
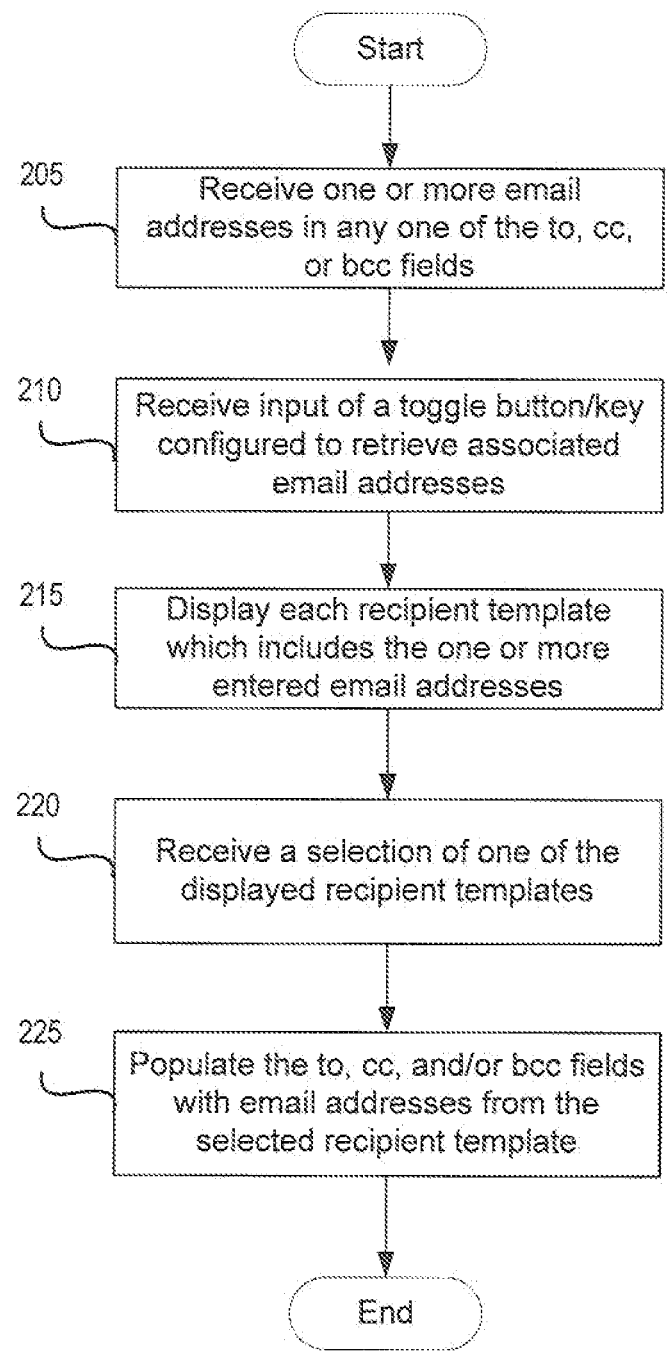
FIG. 2 is a flow diagram for a method of implementing email recipient templates, in accordance with further aspects of the present invention.

Referring next to FIG. 2, which illustrates a method of implementing email recipient templates, in accordance with further embodiments of the present invention. At process block 205, one or more email addresses in any one of the to, cc, or bcc fields is received. Then, at process block 210, input of a toggled button/hot-key may be received which is configured to retrieve associated email addresses. The email addresses associated with each recipient template may be displayed to the user (process block 215).

At process block 220, a selection of one of the displayed recipient templates may be received, and as such, based on selected recipient template, the to, cc, and bcc fields may be populated with the corresponding email addresses from the recipient template according to the placement of the email addresses in the recipient template (i.e., in the to, cc, or bcc fields, respectively).

Figure 3:
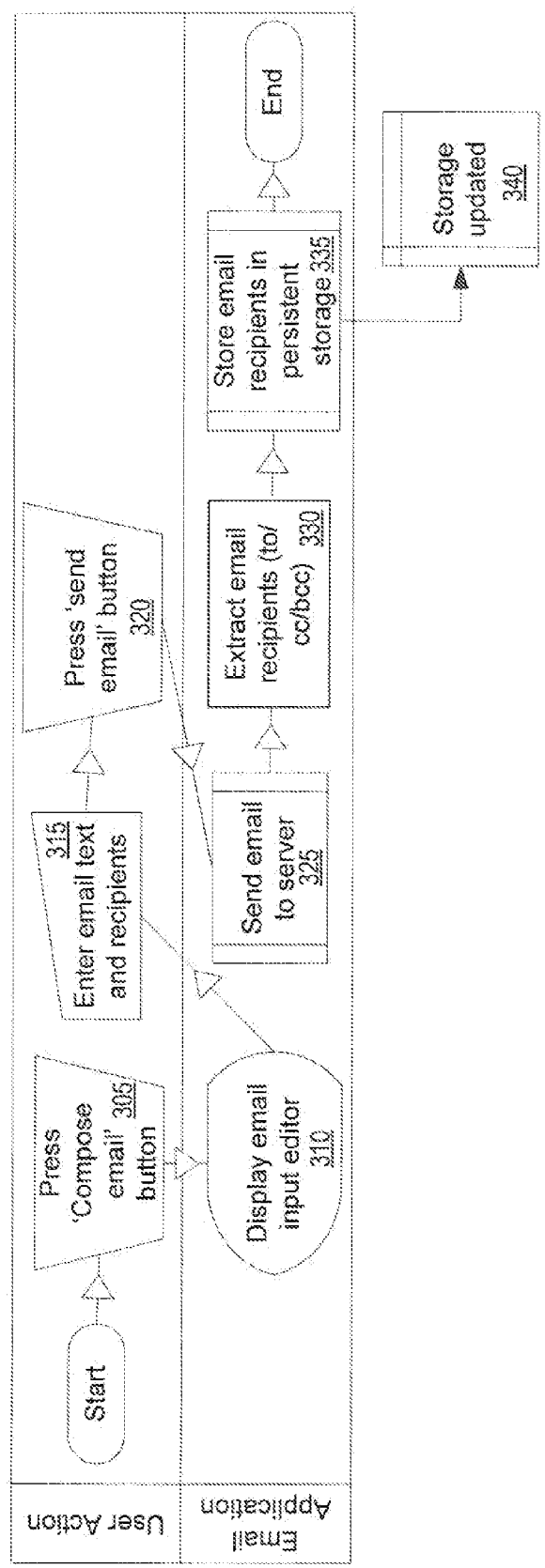
FIG. 3 is a flow diagram for implementing a method of providing a first time use of an email editor (without importing recipient templates), or email sent by a user without using templates, in accordance with embodiments of the present invention.

Turning next to FIG. 3, which illustrates a flow diagram for implementing a method of providing a first time use of an email editor (without importing recipient templates), or email sent by a user without using templates, in accordance with embodiments of the present invention. At process block 305, for the user side (or at the email client) a "compose email" button may be pressed. Accordingly, on the email application (or mail server) side, an email input editor may be displayed to the user (process block 310).

At process block 315, the user may enter email text and recipients into the email editor. In one embodiment, the email addresses may be entered into any one of the to, cc, or bcc fields of the email editor. At process block 320, a "send email" button press is recorded, and the email application sends the composed email to the mail server (process block 325). At process block 330, the email application extracts the to/cc/bcc fields from email and stores the addresses in a storage file, for example in an XML file.

At process block 335, the to/cc/bcc recipient selection are stored in the XML format, and a new recipient template is generated with a usage count set to 1 (or the usage count is incremented by 1 for existing recipient templates which match the exact recipients used by user in the current email). Furthermore, an email address index XML is updated, which maps each email address to all recipient templates in which the email address exists (to allow faster search of recipient templates related to an email). This index stores information classified based on whether the email address exists in to, cc, or bcc fields of the respective recipient templates. Further, at process block 340, a persistent storage is updated with the new counts, recipient templates, and indexes.

Figure 4A:
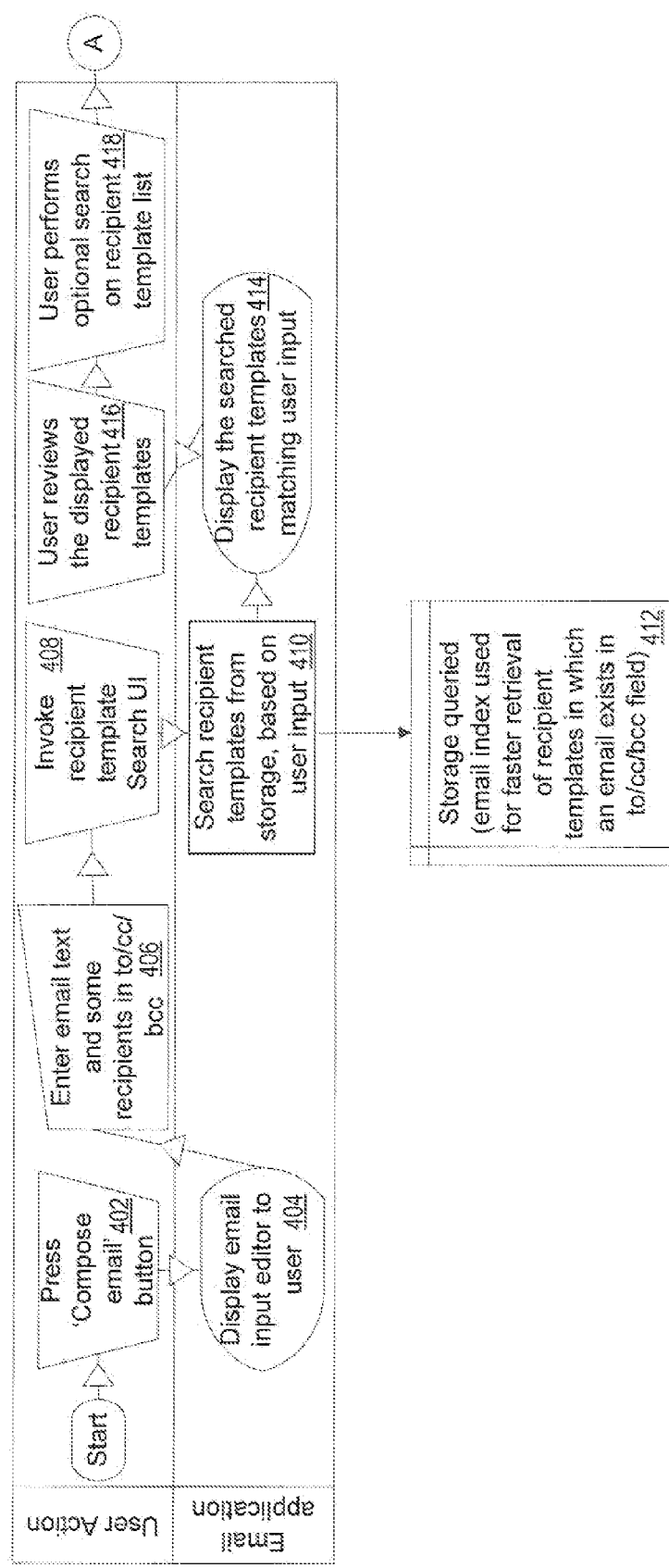
FIGS. 4A, 4B, and 4C are flow diagrams for methods of use of an email editor (or first use of the email editor, after importing previously saved recipient templates), in accordance with aspects of the present invention.

Turning now to FIG. 4A, which illustrates a method of use of an email editor (or first use of the email editor, after importing previously saved recipient templates), in accordance with embodiments of the present invention. At process block 402, for the user side (or at the email client) a "compose email" button may be pressed. Accordingly, on the email application (or mail server) side, an email input editor may be displayed to the user (process block 404).

At process block 406, the user may enter email text and recipients into the email editor. In one embodiment, the email addresses may be entered into any one of the to, cc, or bcc fields of the email editor. Optionally, user could also input a 'recipient template name' of a previously saved template. At process block 408, a recipient template search UI could also be invoked by the user (in one embodiment, without entering any email addresses or template names in the email) to select most used recipient template.

At process block 410, a search of the recipient templates from a storage device, based on the user input, may be conducted. Accordingly, at process block 412, the search query may be stored in a persistent storage (i.e., an email index used for faster retrieval of recipient templates in which an email exists in to/cc/bcc field). Furthermore, at process block 414, the searched recipient templates matching the received search criteria may be displayed. For example, the recipient templates may be displayed in a pop-up window, a drop-down box, etc.

Figure 4B:
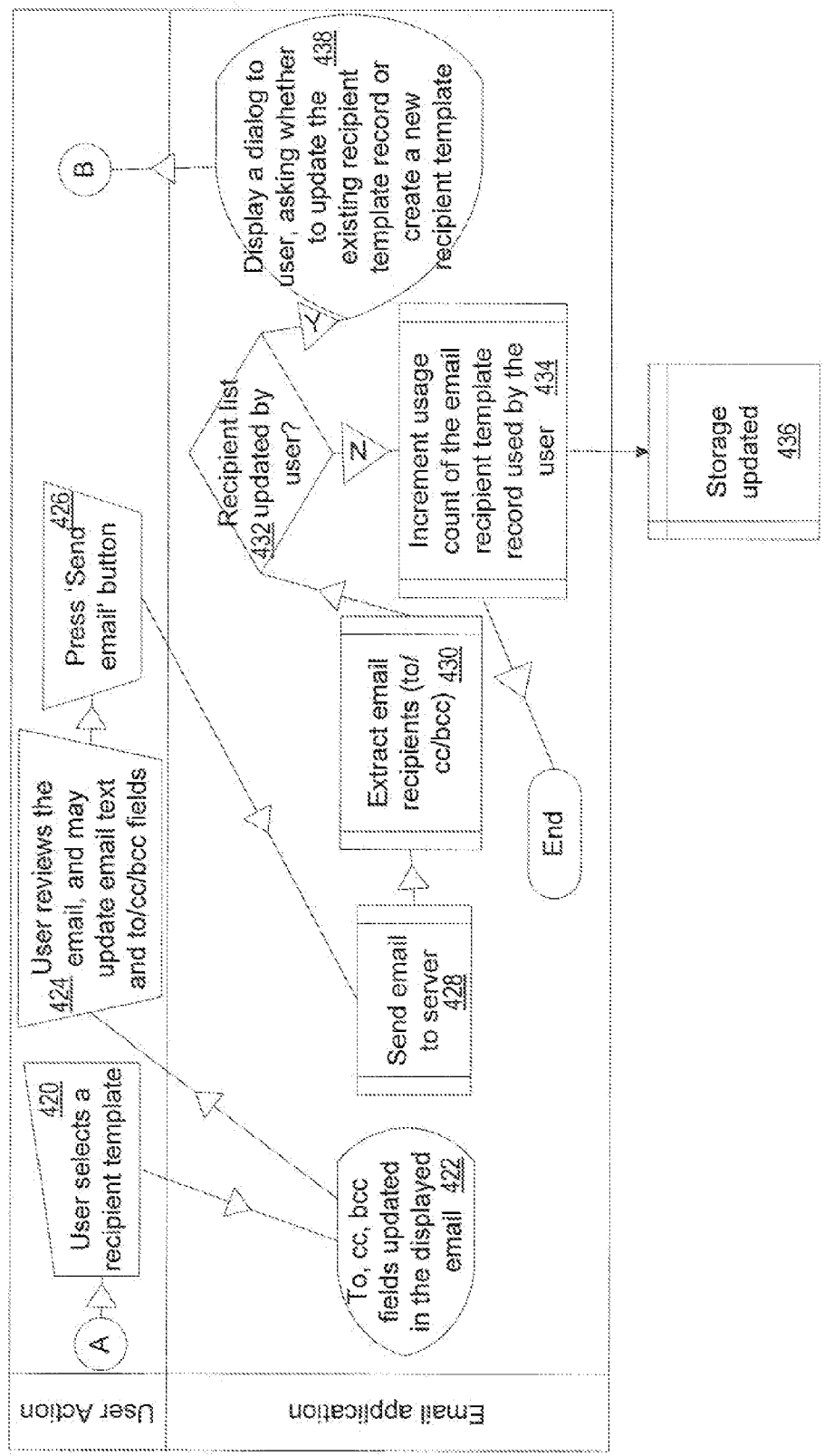

At process block 416, the user is able to review the displayed recipient templates, and then the user may optionally be able to perform a search on the to, cc, and bcc fields, or alternatively, the user could perform a search on the "Recipient template name" (if one had been previously set). Turning next to FIG. 4B, which further illustrates a method of use of an email editor (or first use of the email editor, after importing previously saved recipient templates) continuing at point 'A', in accordance with embodiments of the present invention. Accordingly, at process block 420, the user selects a recipient template (or templates) to use in the email message.

At process block 422, the corresponding to, cc, and bcc fields are updated (populated) with the email addresses as provided by the selected recipient template. At process block 424, the user is able to review the email message and may update/change the email text as well as the to, cc, and bcc email addresses. Furthermore, in the event that the user changes the to, cc, or bcc email addresses, a new recipient template may be generated, if it is determined that the revised email addresses combination is not included in a previous recipient template. Once the user is satisfied with the email message text and the email addresses, the user may then press the "send" button.

At process block 428, the email message is sent to the mail server, and the email addresses in the to, cc, and bcc fields are then extracted from the message (process block 430). At decision block 432, a determination is made whether the recipient list (i.e., the to, cc, or bcc fields) of the email have been updated by the user. If it is determined that the list has not been updated, then at process block 434, the usage count for the particular recipient template is incremented and then the storage for the recipient templates is updated (process block 436).

Alternatively, if it is determined that the recipient list has been updated, then at process block 438, a dialog may be displayed to the user which inquires whether to update the existing recipient template record or create a new recipient template. Furthermore, this could also be configured by user to "automatically update", in which case, the user may not be shown a dialog, and, for example, a yes/no would be taken from user preferences. The process then continues to point "B".

Figure 4C:
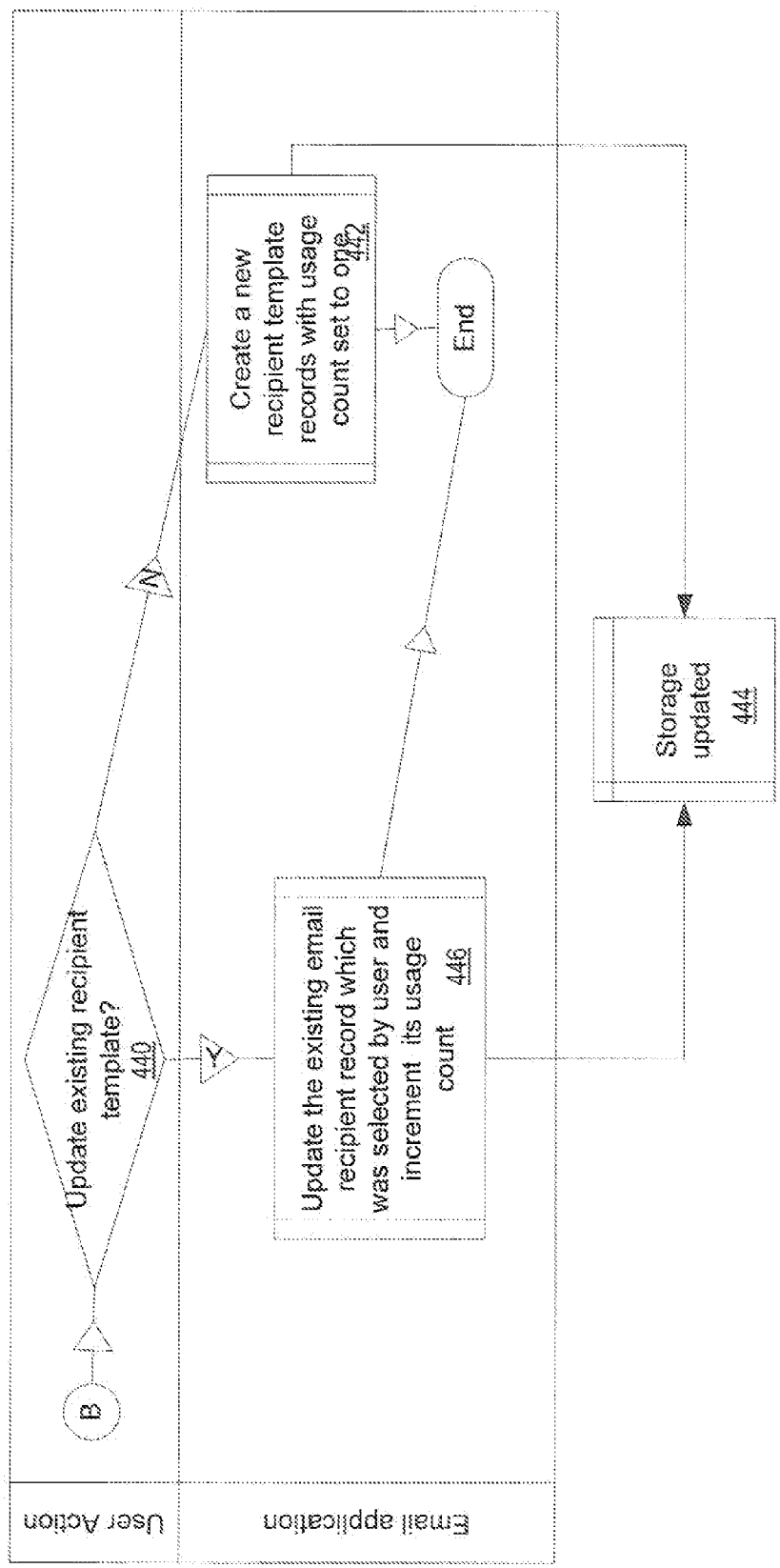

Turning now to FIG. 4C, which further illustrates a method of use of an email editor (or first use of the email editor, after importing previously saved recipient templates) continuing at point "B", in accordance with embodiments of the present invention. At decision block 440, a determination of whether to update the existing recipient template. As pointed out above, this could be configured by user in "user preferences", in which case, the user will not be shown this dialog, and the yes/no would be taken from user preferences.

If it is determined that an update to the existing template is not needed, then at process block 442, a new recipient template record is created and the usage count is set to one. Furthermore, at process block 444, the storage is updated with the new record. Alternatively, if it is determined that an update to an existing recipient template is needed, then at process block 446, the existing recipient template record which was selected by user is updated and the usage count is incremented by one.

Figure 5:
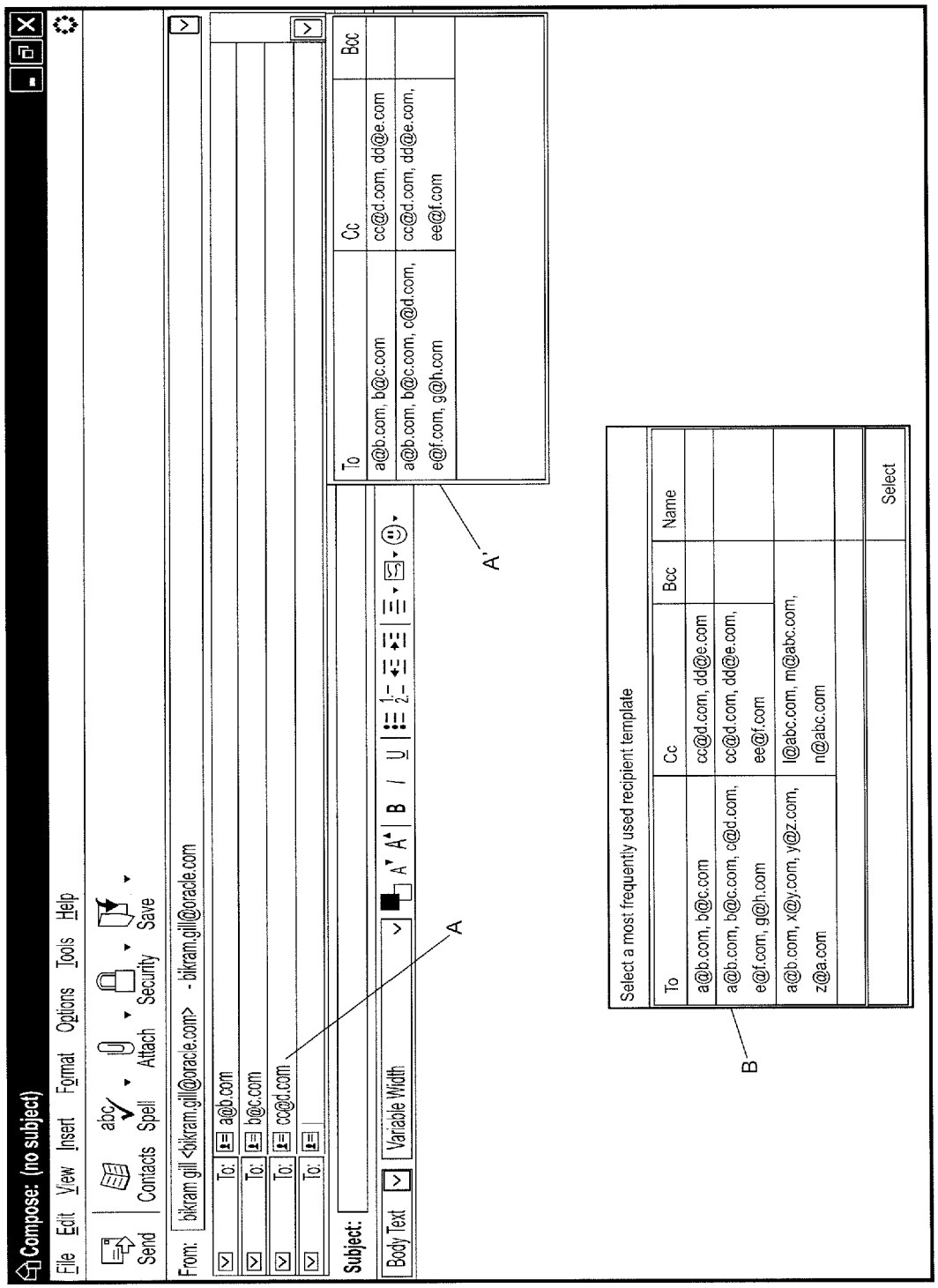
FIG. 5 is a graphical user interface (UI) for using email recipient templates, in accordance with embodiments of the present invention.

Turning now to FIG. 5, which illustrates a graphical user interface (UI) for using email recipient templates, in accordance with embodiments of the present invention. At points A and A', based on the email addresses entered by the user in the to/cc/bcc fields, the user is able to invoke a drop-down (or similar GUI interface element) list to display a short list of historical recipient templates and select one of the recipient templates to be used for sending the email message.

Furthermore, at point B, the user is also able to invoke a pop-up to display the most frequently used templates. The pop-up may display the most used templates, the pop-up may display the most used templates which only include the email addresses entered by the user in the to/cc/bcc fields. In the pop-up the user may also have the option to further refine the search based on the to/cc/bcc fields or name field. Alternatively, such pop-ups may also be displayed over some specific time records, for example.

FIG. 6 is a simplified block diagram illustrating physical components of a system environment 600 that may be used in accordance with an embodiment of the present invention. This diagram is merely an example, which should not unduly limit the scope of the claims. One of ordinary skill in the art would recognize many variations, alternatives, and modifications.

As shown, system environment 600 includes one or more client computing devices 602, 604, 606, 608 communicatively coupled with a server computer 610 via a network 612. In one set of embodiments, client computing devices 602, 604, 606, 608 may be configured to run one or more components of a graphical user interface described above. For example, client computing devices allow user to create and customize network communities, enter search queries, view search results, and others.

Client computing devices 602, 604, 606, 608 may be general purpose personal computers (including, for example, personal computers and/or laptop computers running various versions of Microsoft Windows™ and/or Apple Macintosh™ operating systems), cell phones or PDAs (running software such as Microsoft Windows™ Mobile and being Internet, e-mail, SMS, Blackberry,™ and/or other communication protocol enabled), and/or workstation computers running any of a variety of commercially-available UNIX™ or UNIX™-like operating systems (including without limitation the variety of GNU/Linux™ operating systems). Alternatively, client computing devices 602, 604, 606, and 608 may be any other electronic device capable of communicating over a network (e.g., network 612 described below) with server computer 610. Although system environment 600 is shown with four client computing devices and one server computer, any number of client computing devices and server computers may be supported.

Server computer 610 may be a general purpose computer, specialized server computer (including, e.g., a LINUX™ server, UNIX™ server, mid-range server, mainframe computer, rack-mounted server, etc.), server farm, server cluster, or any other appropriate arrangement and/or combination. Server computer 610 may run an operating system including any of those discussed above, as well as any commercially available server operating system. Server computer 610 may also run any of a variety of server applications and/or mid-tier applications, including web servers, Java virtual machines, application servers, database servers, and the like. In various embodiments, server computer 610 is adapted to run one or more Web services or software, applications described in the foregoing disclosure. For example, server computer 610 is specifically configured to implemented enterprise procurement systems described above.

As shown, client computing devices 602, 604, 606, 608 and server computer 610 are communicatively coupled via network 612. Network 612 may be any type of network that can support data communications using any of a variety of commercially-available protocols, including without limitation TCP/IP, SNA, IPX, AppleTalk™, and the like. Merely by way of example, network 612 may be a local area network (LAN), such as an Ethernet network, a Token-Ring network and/or the like; a wide-area network; a virtual network, including without limitation a virtual private network (VPN); the Internet; an intranet; an extranet; a public switched telephone network (PSTN); an infra-red network; a wireless network (e.g., a network operating under any of the IEEE 802.11 suite of protocols, the Bluetooth™ protocol known in the art, and/or any other wireless protocol); and/or any combination of these and/or other networks. In various embodiments, the client computing devices 602, 604, 606, 608 and server computer 610 are able to access the database 614 through the network 612. In certain embodiments, the client computing devices 602, 604, 606, 608 and server computer 610 each has its own database.

System environment 600 may also include one or more databases 614. Database 614 may correspond to an instance of integration repository as well as any other type of database or data storage component described in this disclosure. Database 614 may reside in a variety of locations. By way of example, database 614 may reside on a storage medium local to (and/or resident in) one or more of the computing devices 602, 604, 606, 608, or server computer 610. Alternatively, database 614 may be remote from any or all of the computing devices 602, 604, 606, 608, or server computer 610 and/or in communication (e.g., via network 612) with one or more of these. In one set of embodiments, database 614 may reside in a storage-area network (SAN) familiar to those skilled in the art. Similarly, any necessary files for performing the functions attributed to the computing devices 602, 604, 606, 608, or server computer 610 may be stored locally on the respective computer and/or remotely on database 614, as appropriate. For example the database 614 stores user profiles, procurement information, attributes associated with network entities.

FIG. 7 is a simplified block diagram illustrating the physical components of a computer system 700 that may be used in accordance with an embodiment of the present invention. This diagram is merely an example, which should not unduly limit the scope of the claims. One of ordinary skill in the art would recognize many variations, alternatives, and modifications.

In various embodiments, computer system 700 may be used to implement any of the computing devices 602, 604, 606, 608, or server computer 610 illustrated in system environment 600 described above. As shown in FIG. 7, computer system 700 comprises hardware elements that may be electrically coupled via a bus 724. The hardware elements may include one or more central processing units (CPUs) 702, one or more input devices 704 (e.g., a mouse, a keyboard, etc.), and one or more output devices 706 (e.g., a display device, a printer, etc.). For example, the input devices 704 are used to receive user inputs for procurement related search queries. Computer system 700 may also include one or more storage devices 708. By way of example, storage devices 708 may include devices such as disk drives, optical storage devices, and solid-state storage devices such as a random access memory (RAM) and/or a read-only memory (ROM), which can be programmable, flash-updateable and/or the like. In an embodiment, various databases are stored in the storage devices 708. For example, the central processing units 702 is configured to retrieve data from a database and process the data for displaying on a GUI.

Computer system 700 may additionally include a computer-readable storage media reader 712, a communications subsystem 714 (e.g., a modem, a network card (wireless or wired), an infra-red communication device, etc.), and working memory 718, which may include RAM and ROM devices as described above. In some embodiments, computer system 700 may also include a processing acceleration unit 716, which can include a digital signal processor (DSP), a special-purpose processor, and/or the like.

Computer-readable storage media reader 712 can further be connected to a computer-readable storage medium 710, together (and, optionally, in combination with storage devices 708) comprehensively representing remote, local, fixed, and/or removable storage devices plus storage media for temporarily and/or more permanently containing computer-readable information. Communications system 714 may permit data to be exchanged with network 612 of FIG. 6 and/or any other computer described above with respect to system environment 600.

Computer system 700 may also comprise software elements, shown as being currently located within working memory 718, including an operating system 720 and/or other code 722, such as an application program (which may be a client application, Web browser, mid-tier application, RDBMS, etc.). In a particular embodiment, working memory 718 may include executable code and associated data structures for one or more of the design-time or runtime components/services illustrated in FIGS. 3 and 6. It should be appreciated that alternative embodiments of computer system 700 may have numerous variations from that described above. For example, customized hardware might also be used and/or particular elements might be implemented in hardware, software (including portable software, such as applets), or both. Further, connection to other computing devices such as network input/output devices may be employed. In various embodiments, the behavior of the view functions described throughout the present application is implemented as software elements of the computer system 700.

In one set of embodiments, the techniques described herein may be implemented as program code executable by a computer system (such as a computer system 700) and may be stored on machine-readable media. Machine-readable media may include any appropriate media known or used in the art, including storage media and communication media, such as (but not limited to) volatile and non-volatile, removable and non-removable media implemented in any method or technology for storage and/or transmission of information such as machine-readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store or transmit the desired information and which can be accessed by a computer.

Although specific embodiments of the present invention have been described, various modifications, alterations, alternative constructions, and equivalents are within the scope of the invention. Further, while embodiments of the present invention have been described using a particular combination of hardware and software, it should be recognized that other combinations of hardware and software are also within the scope of the present invention. The present invention may be implemented only in hardware, or only in software, or using combinations thereof.

The specification and drawings are, accordingly, to be regarded in an illustrative rather than a restrictive sense. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A method for implementing email recipient templates, the method comprising:

extracting a set of email addresses from each outbound email message sent by a user, wherein the set of email addresses are included in one or more of the to, cc, or bcc fields of the email messages;

storing, in a storage database, a template for each extracted set of email addresses, the templates comprising a first set of email addresses in a first recipient template and a second set of email addresses in a second recipient template, wherein the first recipient template and the second recipient template each have an associated unique identifier;

storing, in a dictionary maintained in the storage database, a unique index for each of the templates, the dictionary comprising a set of three lists, the lists comprising one list for the to field of email messages, one list for the cc field of email addresses, and one list for the bcc field of email addresses, and wherein storing the unique index for each of the templates in the dictionary comprises storing the index for each template in one or more of the lists based on which field the email address is extracted from;

receiving a request for a new email message in an email editor user interface;

querying the storage database for recipient templates using the dictionary, wherein the query is filtered by the associated unique identifiers;

receiving the first recipient template and the second recipient template as a result of the query; and displaying, in the email editor user interface, the email addresses associated with the first recipient template and the second recipient template.

2. The method for implementing email recipient templates as in claim 1, further comprising storing an outbound record for each to/cc/bcc combination used by each email user in outbound email messages.

3. The method for implementing email recipient templates as in claim 2, further comprising storing an inbound record for each to/cc/bcc combination used by each email user in incoming email messages.

4. The method for implementing email recipient templates as in claim 3, further comprising generating a unique template for each of the outbound and inbound records.

5. The method for implementing email recipient templates as in claim 4, associating a name field for each unique template.

6. The method for implementing email recipient templates as in claim 5, wherein the name field is either automatically generated based in part on the to/cc/bcc fields of the template or a custom generation from user or an administrator.

7. The method for implementing email recipient templates as in claim 1, further comprising receiving one or more email addresses in any one of the to, cc, or bcc fields.

8. The method for implementing email recipient templates as in claim 7, further comprising receiving input of a toggle button/key configured to retrieve associated email addresses.

9. The method for implementing email recipient templates as in claim 8, further comprising displaying each of the recipient template which include the one or more entered email addresses.

10. The method for implementing email recipient templates as in claim 9, further comprising receiving a selection of one of the displayed recipient templates.

11. The method for implementing email recipient templates as in claim 10, further comprising populating the to, cc, and/or bcc fields with email addresses from the selected recipient template.

12. A computer-readable memory having sets of instructions stored thereon which, when executed by a computer, cause the computer to:
   extract a set of email addresses from each outbound email message sent by a user, wherein the set of email addresses are included in one or more of the to, cc, or bcc fields of the email messages;
   store, in a storage database, a template for each extracted set of email addresses, the templates comprising a first set of email addresses in a first recipient template and a second set of email addresses in a second recipient template, wherein the first recipient template and the second recipient template each have an associated unique identifier;
   storing, in a dictionary maintained in the storage database, a unique index for each of the templates, the dictionary comprising a set of three lists, the lists comprising one list for the to field of email messages, one list for the cc field of email addresses, and one list for the bcc field of email addresses, and wherein storing the unique index for each of the templates in the dictionary comprises storing the index for each template in one or more of the lists based on which field the email address is extracted from;
   receive a request for a new email message in an email editor user interface;
   query the storage database for recipient templates using the dictionary, wherein the query is filtered by the associated unique identifiers;
   receive the first recipient template and the second recipient template as a result of the query; and
   display, in the email editor user interface, the email addresses associated with the first recipient template and the second recipient template.

13. The computer-readable memory as in claim 12, wherein the sets of instructions when further executed by the computer, cause the computer to receive one or more email addresses in any one of the to, cc, or bcc fields.

14. The computer-readable memory as in claim 13, wherein the sets of instructions when further executed by the computer, cause the computer to receive input of a toggle button/key configured to retrieve associated email addresses.

15. The computer-readable memory as in claim 14, wherein the sets of instructions when further executed by the computer, cause the computer to display each of the recipient template which include the one or more entered email addresses.

16. The computer-readable memory as in claim 15, wherein the sets of instructions when further executed by the computer, cause the computer to receive a selection of one of the displayed recipient templates.

17. The computer-readable memory as in claim 16, wherein the sets of instructions when further executed by the computer, cause the computer to populate the to, cc, and/or bcc fields with email addresses from the selected recipient template.

18. A system for implementing email recipient templates, the system comprising:
   a memory device; and
   a processor coupled with the memory device, the memory device having sets of instructions stored thereon, which when executed by the processor, cause the processor to:
   extract set of email addresses from each outbound email message sent by a user, wherein the set of email addresses are included in one or more of the to, cc, or bcc fields of the email messages;
   store, in a storage database, a template for each extracted set of email addresses, the templates comprising first set of email addresses in a first recipient template and storing the second set of email addresses in a second recipient template, wherein the first recipient template and the second recipient template each have an associated unique identifier;
   storing, in a dictionary maintained in the storage database, a unique index for each of the templates, the dictionary comprising a set of three lists, the lists comprising one list for the to field of email messages, one list for the cc field of email addresses, and one list for the bcc field of email addresses, and wherein storing the unique index for each of the templates in the dictionary comprises storing the index for each template in one or more of the lists based on which field the email address is extracted from;
   receive a request for a new email message in an email editor user interface;
   query the storage database for recipient templates using the dictionary, wherein the query is filtered by the associated unique identifiers;
   receive the first recipient template and the second recipient template as a result of the query; and
   display, in the email editor user interface, the email addresses associated with the first recipient template and the second recipient template.

* * * * *

UNITED STATES PATENT AND TRADEMARK OFFICE
CERTIFICATE OF CORRECTION

Page 1 of 1

PATENT NO. : 8,762,385 B2
APPLICATION NO. : 13/016357
DATED : June 24, 2014
INVENTOR(S) : Gill et al.

It is certified that error appears in the above-identified patent and that said Letters Patent is hereby corrected as shown below:

In the Specification

Column 1, line 49, delete "bee" and insert -- bcc --, therefor.

Column 5, line 38, delete "bee" and insert -- bcc --, therefor.

Column 7, line 67, delete "Blackberry,™" and insert -- Blackberry™, --, therefor.

Signed and Sealed this
Twenty-fourth Day of February, 2015

Michelle K. Lee
*Deputy Director of the United States Patent and Trademark Office*